United States Patent
Nishii et al.

(10) Patent No.: US 6,918,372 B2
(45) Date of Patent: Jul. 19, 2005

(54) INTAKE SYSTEM OF INTERNAL COMBUSTION ENGINE

(75) Inventors: Satoshi Nishii, Yokohama (JP); Taro Sakai, Kawasaki (JP); Yuusuke Hosokawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/815,972

(22) Filed: Apr. 2, 2004

(65) Prior Publication Data

US 2004/0244767 A1 Dec. 9, 2004

(30) Foreign Application Priority Data

Apr. 3, 2003 (JP) .................................. 2003-100197
Apr. 3, 2003 (JP) .................................. 2003-100201

(51) Int. Cl.[7] .............................................. F02B 31/06
(52) U.S. Cl. ......................... 123/306; 123/308; 123/302
(58) Field of Search ................... 123/302, 305, 123/306, 308, 188.14

(56) References Cited

U.S. PATENT DOCUMENTS

| | | | | |
|---|---|---|---|---|
| 5,632,244 A | * | 5/1997 | Endres et al. ................ | 123/306 |
| 6,499,456 B1 | | 12/2002 | Nogi et al. | |
| 6,598,585 B2 | | 7/2003 | Schweinzer et al. | |
| 6,615,789 B2 | * | 9/2003 | Inoue et al. .............. | 123/193.6 |
| 6,705,279 B2 | * | 3/2004 | Iriya ........................... | 123/301 |
| 6,742,495 B2 | * | 6/2004 | Ashida et al. .............. | 123/310 |
| 6,745,743 B2 | * | 6/2004 | Abo et al. ................... | 123/295 |
| 6,748,919 B2 | * | 6/2004 | Abo et al. ................... | 123/299 |
| 2002/0020389 A1 | | 2/2002 | Wolters | |
| 2002/0050266 A1 | * | 5/2002 | Okamoto et al. ........... | 123/298 |
| 2002/0078921 A1 | | 6/2002 | Kim et al. | |
| 2004/0065296 A1 | | 4/2004 | Arimatsu et al. | |
| 2004/0065297 A1 | | 4/2004 | Sakai et al. | |
| 2004/0159314 A1 | * | 8/2004 | Ishizuka et al. ............ | 123/572 |
| 2004/0206343 A1 | * | 10/2004 | Oota et al. .................. | 123/572 |
| 2004/0231638 A1 | * | 11/2004 | Tominaga et al. .......... | 123/308 |

FOREIGN PATENT DOCUMENTS

| | | | |
|---|---|---|---|
| DE | 101 63 284 A1 | 7/2002 | |
| DE | 102 04 768 A1 | 8/2002 | |
| EP | 1 006 265 A1 | 6/2001 | |
| EP | 1 108 878 A2 | 6/2001 | |
| EP | 1 223 329 A2 | 7/2002 | |
| GB | 2 283 058 A | 4/1995 | |
| JP | 61-98919 A | 5/1986 | |
| JP | 6-159079 A | 6/1994 | |
| JP | 6-159203 A | 6/1994 | |
| JP | 264816 * | 9/1994 | ............. F02F/1/42 |
| JP | 2001-193469 A | 7/2001 | |
| JP | 2001-248484 A | 9/2001 | |
| JP | 2002-54535 A | 2/2002 | |
| JP | 124836 * | 4/2004 | ........... F02B/31/00 |

OTHER PUBLICATIONS

U.S. Appl. No. 10/816,001, filed Apr. 2, 2004, Sakai et al.
U.S. Appl. No. 10/815,974, filed Apr. 2, 2004, Sakai.
U.S. Appl. No. 10/815,969, filed Apr. 02, 2004, Tominaga et al.

* cited by examiner

*Primary Examiner*—Hai Huynh
(74) *Attorney, Agent, or Firm*—Foley & Lardner LLP

(57) ABSTRACT

An internal combustion engine includes an intake port leading to an engine cylinder. The intake port is divided into first and second passage section by a partition extending in the intake port in a longitudinal direction of the intake port. A gas motion control valve is arranged to open and close an upstream end of the second passage section. A connection passage connects an upstream end portion of the second passage section to the first passage section. A fuel injector is directed to inject fuel toward a valve opening of the intake valve through a space on the downstream side of the downstream end of the partition.

24 Claims, 15 Drawing Sheets

INTAKE SYSTEM OF INTERNAL COMBUSTION ENGINE

BACKGROUND OF THE INVENTION

The present invention relates to an intake system for an internal combustion engine, and more specifically to an intake system including an intake port for increasing incylinder gas motion such as tumble or swirl.

Gas motion in engine cylinder such as tumble or swirl is one of important factors to achieve stable combustion of diluted air/fuel mixture in a spark ignition internal combustion engine. Accordingly, engines of some types require an intake system which can increase incylinder gas motion in wider engine operating region.

A published Japanese Patent Application Kokai Publication No. 2002-54535 shows a gas motion control valve to increase incylinder gas flow by closing a part of the section of an intake port with a gas motion control valve. For tumble, for example, the gas motion control valve is disposed in a lower part of the intake port, and arranged to strengthen the intake air stream alongside the upper side of the intake port. A published Japanese Patent Application Kokai Publication No. H06(1994)-159079 shows an intake system including a partition dividing an intake port into upper and lower halves, and a gas motion control valve closing the lower half of the intake port, to increase a tumble ratio. A published Japanese Patent Application Kokai Publication No. H06(1994)-159203 shows an intake system including a partition dividing an intake port into upper and lower halves, a gas motion control valve and a fuel injector injecting fuel toward the partition so that the fuel drops from the downstream end of the partition toward an intake valve. A published Japanese Patent Application Kokai Publication No. 2001-193469 shows an intake system including a partition having a pair of grooves.

SUMMARY OF THE INVENTION

Such a gas motion control valve is arranged to produce an incylinder tumbling flow by decreasing an open area ratio that is a ratio of an effective flow passage sectional area to an entire flow passage area of an intake port. However, as the open area ratio becomes smaller, the flow resistance increases, and the amount of intake air that a cylinder can take in becomes smaller. Therefore, an engine operating region in which an incylinder flow is increased by a gas motion control valve is limited to a relatively narrow range.

In the intake system in which fuel is injected to a partition, fuel adheres to the partition, and enters the cylinder in the form of large droplets, so that the amount of HC in the exhaust gases increases.

It is an object of the present invention to provide an intake system for increasing incylinder gas motion without decreasing the open area ratio of an intake port excessively.

According to one aspect of the present invention, an internal combustion engine, comprises: a cylinder head defining an intake port leading to a cylinder of the engine; an intake valve located at a downstream end of the intake port; a flow regulating section to regulate an intake air flow in the intake port, the flow regulating section including; a partition extending in the intake port in a longitudinal direction of the intake port from an upstream end to a downstream end which is located in the cylinder head, and dividing the intake port into first and second passage sections; a gas motion control valve located by the upstream end of the partition, to open and close the second passage section; and a connection passage to allow recirculating flow of intake air in the second passage section from the second passage section to the first passage section when the second passage section is closed by the gas motion control valve; and a fuel injector directed to inject fuel toward a valve opening of the intake valve through a space on the downstream side of the downstream end of the partition.

According to another aspect of the invention, an intake apparatus for an internal combustion engine, comprises: first means for defining an intake port; second means for dividing the intake port into first and second passage sections extending in a longitudinal direction of the intake port; third means for closing an upstream end of the second passage section and forming a low pressure region in the first passage section; fourth means for drawing intake air from a downstream end of the second passage section through the second passage section to the low pressure region in the first passage section when the upstream end of the second passage section is closed; and fifth means for injecting fuel in an oblique direction extending from the first passage section to the second passage section through a space between the partition and the downstream end of the intake port.

DETAILED DESCRIPTION OF THE INVENTION

Figure 1:
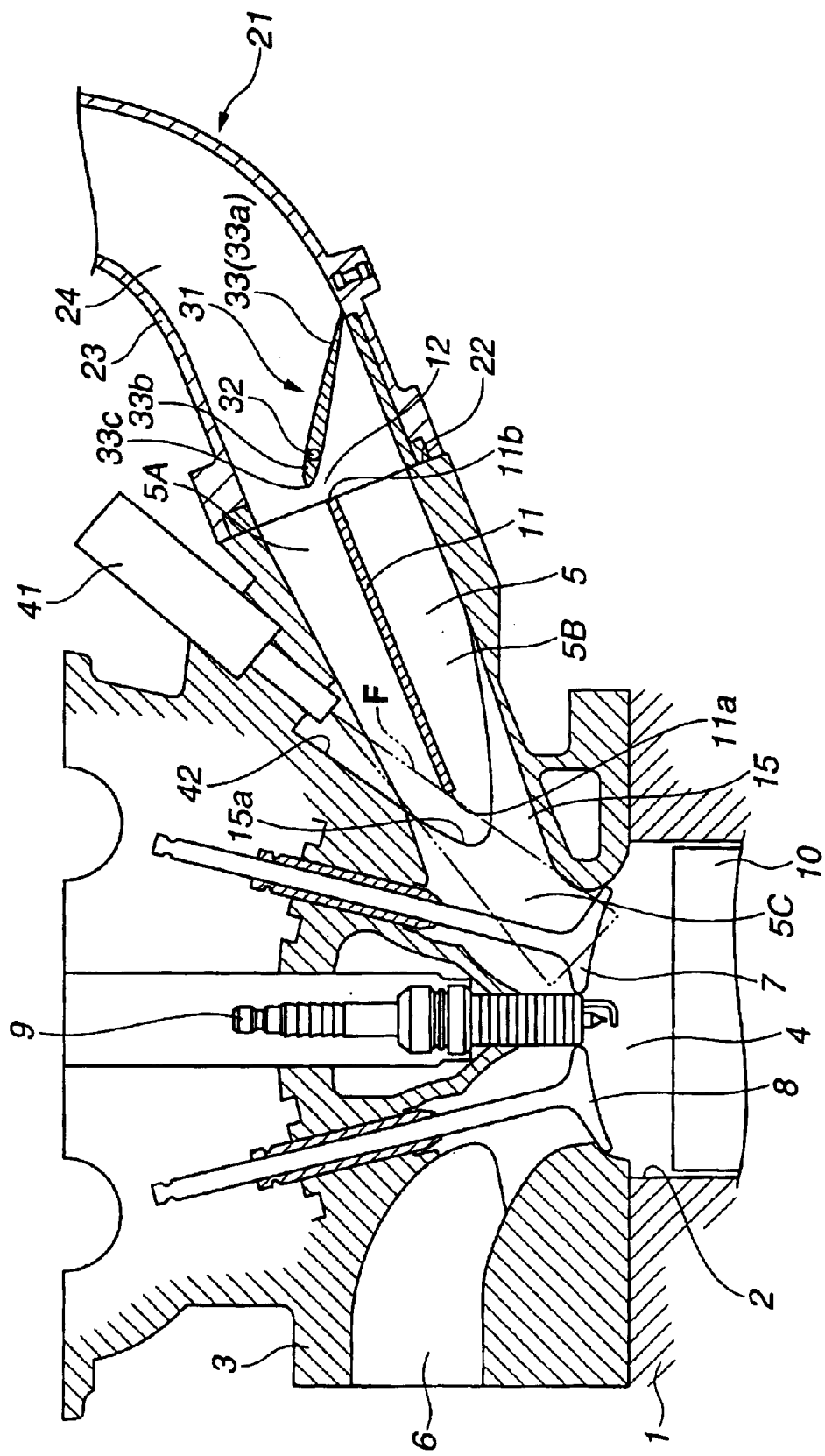
FIG. 1 is a sectional view showing an engine with an intake system according to a first embodiment of the present invention.
Figure 2:
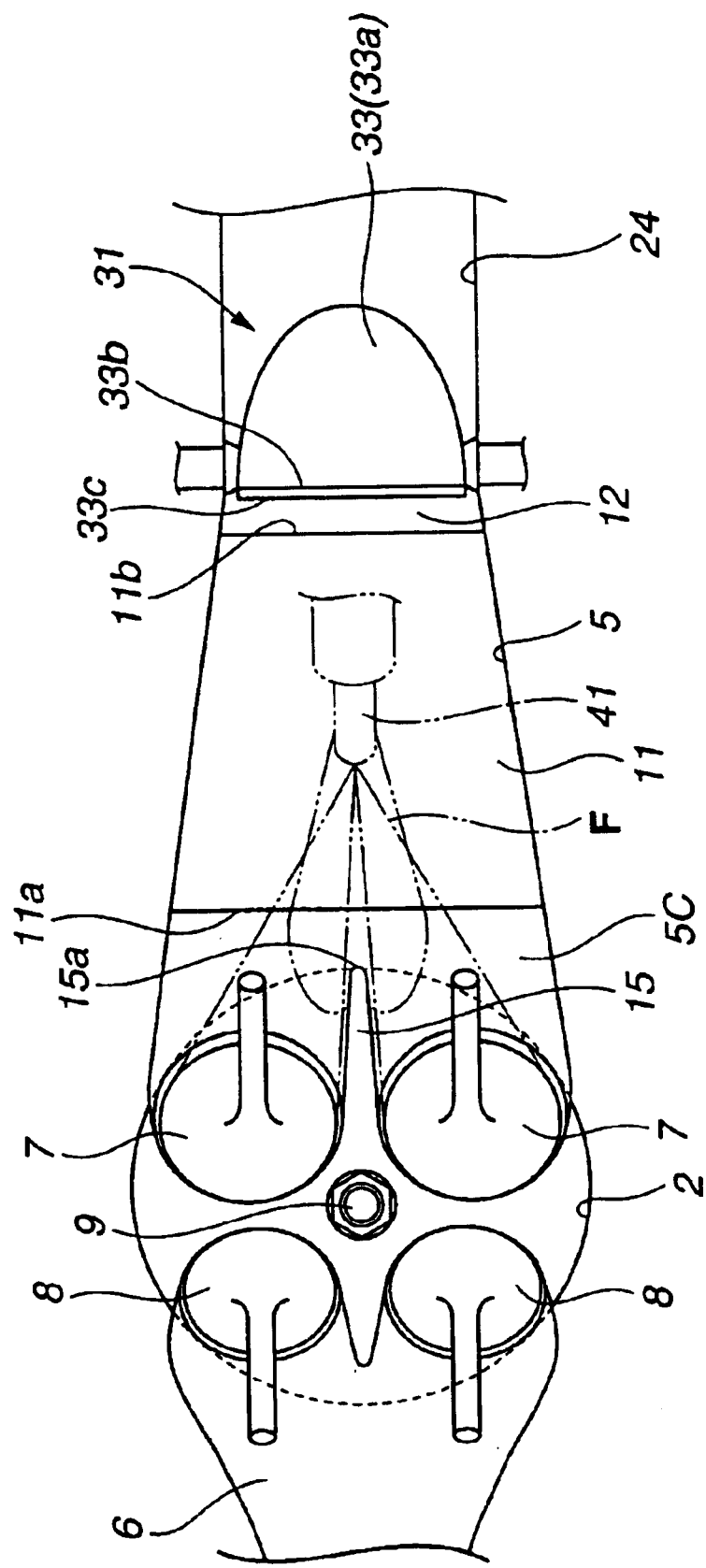
FIG. 2 is a plan view of the intake system of FIG. 1 as viewed from above.

FIGS. 1 and 2 show a part of an internal combustion engine having an intake system according to a first embodiment of the present invention. The engine of this example is a port injection spark ignition engine. The intake apparatus or system is designed to strengthen an incylinder gas motion which, in this example, is tumble.

A cylinder block 1 is formed with a plurality of cylinders 2 having a cylindrical shape. A cylinder head 3 closes the upper ends of the cylinders 2. Cylinder head 3 is formed with a plurality of recesses each defining a combustion chamber 4. In this example, combustion chamber 4 of each cylinder is of the pentroof type, and having two sloping surfaces. As shown in FIG. 1, an intake port 5 extends to a downstream end opening in one of the two sloping surfaces of combustion chamber 4. An exhaust port 6 opens in the other sloping surface of combustion chamber 4. An intake valve 7 shown in FIG. 1 is arranged to open and close the downstream end of intake port 5. An exhaust valve 8 is arranged to open and close the end of exhaust port 6. In this example, a downstream end portion of intake port 5 is bifurcated by a center wall 15 extending vertically in an up-and-down or axial direction of the cylinder, and has two branches each opening into combustion chamber 4. Accordingly, each cylinder has two intake valves 7 for opening and closing the downstream ends of two branches of intake port 5. Similarly, each cylinder has two exhaust valves 8. A spark plug 9 is provided at the center of combustion chamber surrounded by these four valves 7 and 8. A piston 10 is received in each cylinder 2. In FIG. 1, piston 10 is shown to have a flat top. However, the piston crown may be designed to have various shapes according to various requirements, such as requirement for stratified charge combustion. In the up-down (axial) direction of each cylinder, piston 10 moves upward toward spark plug 9, and moves downward away from spark plug 9.

The intake system shown in FIGS. 1 and 2 includes a partition 11 extending in the longitudinal direction of intake port 5 and dividing the cross section of intake port 5 into an upper region and a lower region. In this example, partition 11 is a metal plate formed as an insert in an operation of casting cylinder head 3, and completed as an integral part of the casting. In this example, cylinder head 3 is a casting of aluminum alloy, and partition 11 is a steel plate. A downstream end 11a of partition 11 is located near intake valves 7. Downstream end 11a of partition 11 confronts an upstream end 15a of the before-mentioned center wall 15 in the vicinity. In the example shown in FIG. 1 (the sectional view taken by a plane perpendicular to the crankshaft of the engine), the portion of intake port 5 receiving partition 11 extends straight in the longitudinal direction of intake port 5, and accordingly partition 11 is in the form of a flat plate extending straight in the longitudinal direction of intake port 5. However, intake port 5 may be curved, and partition 11 may be curved along the curved section of intake port 5.

An upstream end 11b of partition 11 of this example extends up to a bearing surface 22 of cylinder head 3 to which an end of an intake manifold 21 is attached. In this example, partition 11 is entirely located in cylinder head 3. Partition 11 may be arranged so that upstream end 11b is located at a position recessed inwardly from the bearing surface 22 toward the downstream side, to avoid interference between partition 11 of steel and a tool for machining bearing surface 22. In this example, upstream end 11a and downstream end 11b both extend rectilinearly in parallel to the flat bearing surface 22 of cylinder head 3. Therefore, the metal plate of partition 11 is in the form of a trapezoid. However, this shape depends on the geometry of intake port 5.

"Upper" means "higher" in position in an axial direction of cylinder 2 from the position of the crankshaft toward the combustion chamber 4. Intake port 5 is an air passage which may be formed only in cylinder head 3. Alternatively, intake port 5 may be formed in cylinder head 3 and an external member, such as an intake manifold, fixed to cylinder head 3.

Partition 11 divides intake port 5 into an upper fluid passage section 5A formed between partition 11 and an upper inside wall surface of intake port 5, and a lower fluid passage section 5B formed between partition 11 and a lower inside wall surface of intake port 5.

Intake manifold 21 includes a collector section and branch sections 23 each extending from the collector section to the intake port of a unique one of the engine cylinders. Therefore, intake port 5 is continuous with a branch passage 24 of the corresponding branch section 23. Thus, an intake passage is formed from the collector section to each cylinder 2. Each branch section 23 includes a downstream section extending rectilinearly in conformity with the straight intake port 5, and an upstream section curved upward to the collector section located above the branch sections.

A gas motion control valve (or intake control valve) 31 is provided for each cylinder, and arranged to open and close an upstream end of lower fluid passage section 5B. Gas motion control valve 31 is disposed in a downstream end portion of the corresponding branch section 23 of intake manifold 21. In this example, a valve shaft 32 of gas motion control valve 31 is located on an (upstream) extension of partition 11 on the upstream side of partition 11. In the example of FIG. 1, valve shaft 32 is located at a position adjacent to upstream end 11b of partition 3, on the upstream side of the upstream end 11b of partition 3. Valve shaft 32 is supported in the branch section 23 of intake manifold 21. A plate-shaped valve element 33 is fixedly mounted on valve shaft 32. Valve element 33 includes a first portion (or main portion) 33a extending from valve shaft 32 in one direction, and a second portion (short extension) 33b extending from valve shaft 32 in the opposite direction. Second portion 33b is shorter than first portion 33a. First portion 33a is shaped like a half of an ellipse corresponding to the shape of a lower half of branch passage 24, as shown in FIG. 2. Second portion 33b has a downstream end 33c extending rectilinearly in parallel to the bearing surface 22 of cylinder head 3, and to the straight upstream end 11b of partition 11. Valve shaft 32 is close to upstream end 11b of partition 11, but spaced from upstream end 11 through such a distance as to avoid interference between second portion 33b of valve element 33, and upstream end 11b of partition 11. In this example, downstream end 33c of portion 33b is located at a position slightly recessed from a flange surface of the branch section 23 to the upstream side. The flange surface of the branch section 23 is put in contact with the bearing surface 22 of cylinder head 3).

Valve shaft 32 is connected with an actuator (not shown). Gas motion control valve 31 is controlled to a closed position shown in FIG. 1 in an engine operating situation to strengthen tumble. In the closed position to close the upstream end of second passage section 5B as shown in FIG. 1, first valve portion 33a is located on the upstream side of valve shaft 32, and valve element 33 is so inclined as to guide the intake flow toward upper inside wall surface into the first passage section 5A on the upper side. First valve portion 33a is so shaped as to fully close the region under valve shaft 32 in such an inclined position. In this example, an inclination angle of valve element 33 (that is, an angle formed between an upstream extension of partition 11 and valve element 33) in the closed state is in the range of 30°~40°. In the closed state, second valve portion 33b projects upward in upper passage section 5A above the level of partition 11. Between upstream end 11b of partition and downstream end 33c of second valve portion 33b, there is formed an interspace 12 serving as a connection passage to allow recirculating flow of intake air in lower passage section 5B from lower passage section 5B to upper passage section 5A when lower passage section 5A is closed by gas motion control valve 31. In this example as shown in FIG. 2, this interspace 12 extends laterally with a uniform width like a straight slit, between the straight upstream end 11b of partition 11 and the straight downstream end 33c of valve element 33.

In an engine operating region such as a high speed high load region where the intake air quantity becomes greater, gas motion control valve 31 is brought to an open position at which valve element 33 extends in the longitudinal direction of intake port 5 (along the flow direction of the intake air). Both of first and second valve portions 33a and 33b of gas motion control valve 31, when in the open position, extend continuously from upstream end 11b of partition 11, in line with partition 11 along the flow direction, so that the passage resistance becomes minimum. Downstream end 33c of second valve portion 33b confronts close to upstream end 11b of partition.

A fuel injector (injection valve) 41 is for injecting fuel into intake port 5 of each cylinder. Fuel injector 41 is disposed above intake port 5 of cylinder head 3. In this example, fuel injector 41 is of a type producing a fuel spray F bifurcated in the shape of letter V so as to direct fuel toward a pair of intake valves 7. Fuel injector 41 is located at the middle in the lateral or widthwise direction (that is, the front and rear direction of the engine) as shown in the plan view of FIG. 2. As shown in FIG. 2, the intake system including one intake port 5, two intake valves 7, one fuel injector 41 and one gas motion control valve 31 is substantially symmetrical in the manner of bilateral symmetry. As shown in FIG. 1, fuel injector 41 is inclined and positioned at a relatively downstream position near the intake valves 7 so that the fuel spray F is directed to the valve openings of intake valves 7 without interference with partition 11. A fuel spout hole at the forward end of fuel injector 41 is located above partition 11, and directed in an oblique direction to produce the fuel spray spreading through a space 5C on the downstream side of downstream end 11a of partition 11, until fuel spreads to a size approximately equal to the diameter of the valve opening of each intake valve 7, at the position of the valve opening. This fuel spray F passes obliquely through an imaginary downstream extension of the partition 11, from the upper side of partition 11 to the lower side of the imaginary extension of the partition 11. In this example, partition 11 is extended to the downstream side and the downward end 11a of partition 11 is located downstream as long as possible, provided that the fuel spray F does not impinge on partition 11. Partition 11 is extended to the downstream side, up to a position very close to the outside boundary of fuel spray F. The shape of fuel spray F is changed more or less in dependence on the pressure in intake port or other factors. Therefore, the position of downward end 11a of partition 11 is determined with an appropriate margin so as to avoid interference with fuel spray F. A recessed portion 42 is formed in the upper wall surface of intake port 5, so that the fuel spray F passes through the space in this recessed portion 42 without interfering with the internal walls of cylinder head 3.

The internal combustion engine of this example is further equipped with an exhaust gas recirculation (EGR) system (not shown) of a known type including an EGR control valve. In particular, this engine is arranged to further decrease the fuel consumption in a part-load engine operating region by achieving stable combustion at a high EGR rate with the aid of incylinder tumble. An EGR gas may be introduced into the collector section of intake manifold 21 or may be introduced to each branch passage 24.

The thus-constructed intake system is operated as follows: On intake stroke, intake valves 7 are opened and piston 10 descends in the downward direction in cylinder 2. In this case, intake air flows into cylinder 2 through an open aperture around each intake valve 7. If, in this case, gas motion control valve 31 is in the open position, intake air flows through both of upper and lower passage sections 5A and 5B, and the intake air flows into cylinder 2 uniformly around intake valve 7. Therefore, the incylinder gas flow is relatively weak.

Figure 3:
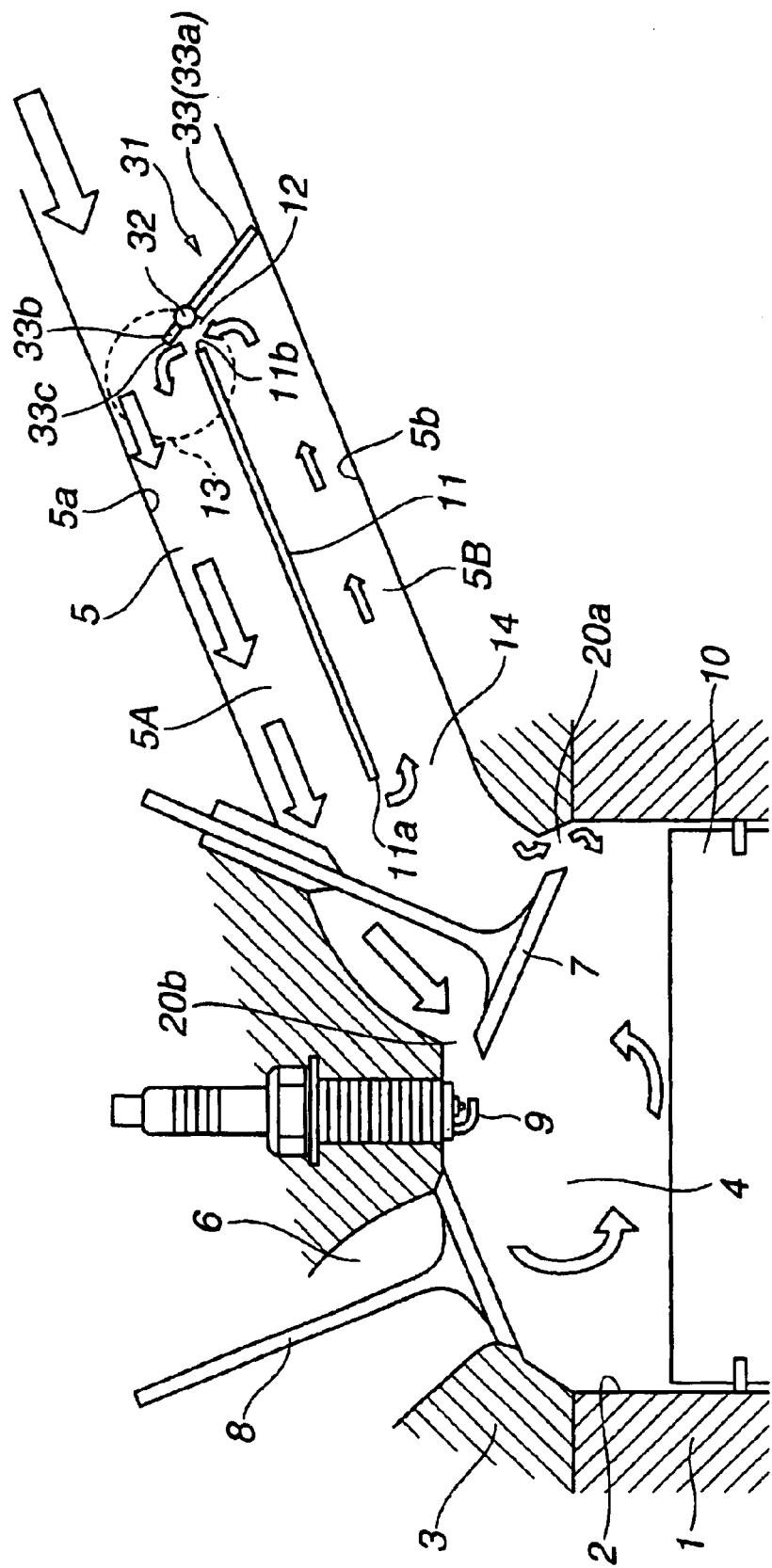
FIG. 3 is a sectional view schematically illustrating the intake system according to the first embodiment.

If, on the other hand, gas motion control valve 31 is in the closed position as schematically shown in FIG. 3, second passage section 5B is closed, and the intake air flows toward cylinder 2 only through upper passage section 5A. Specifically, an intake air stream alongside an upper inside wall surface 5a of intake port 5 is increased whereas an intake air stream alongside a lower inside wall surface 5b of intake port 5 is decreased. Therefore, the intake flow rate is smaller and the flow velocity is lower in a lower portion 20a of the open aperture between intake valve 7 and the outer circumference of the cylinder 2. In an upper portion 20b of the aperture formed between intake valve 7 and spark plug 9, the intake flow rate is great and the flow velocity is high. In the cylinder 2, there is formed a strong tumbling fluid motion as shown by arrows in FIG. 1 (so-called forward tumble) flowing from the intake side of intake valves 7 to the exhaust side of exhaust valves 8, and toward the piston crown. Moreover, gas motion control valve 31 in the closed state as shown in FIG. 3 serves as a throttle portion throttling the fluid passage only to upper passage section 5A, and thereby produces a local low pressure region 13 in upper passage section 5A at a position near the upstream end 11b of partition 11. Connection passage 12 is opened in this low pressure region 13, and there is formed a pressure difference between a downstream open end 14 of lower passage section 5B and connection passage 12. Because of this pressure difference, part of the intake air is taken in from downstream open end 14, into lower passage section 5B, and caused to flow backward to the upstream side through lower passage section 5B, and discharged through connection passage 12 into the low pressure region 13 in upper passage section 5A. Therefore, most of intake air flows along upper inside wall surface 5a to intake valve 7. Consequently, the intake air stream through upper portion 20b of the aperture formed between intake valve 7 and spark plug 9 is further increased, and the intake air stream through the lower portion 20a of the open aperture between intake valve 7 and the outer circumference of the cylinder 2 is decreased. Thus, this intake apparatus can further increase the incylinder tumble. This intake apparatus can promote the tumble in the cylinder effectively, by strengthening the upper intake flow stream, and on the other hand by reducing the lower intake stream flowing along the lower inside wall surface 5b, into cylinder 2 in such direction as to impede the incylinder tumbling motion.

The thus-produced strong incylinder tumble is very helpful for increasing the EGR quantity to improve the fuel economy. In the part load region, the intake system can achieve stable combustion for better fuel consumption by increasing the amount of EGR and producing strong tumble by closing gas control valve 31.

In this example, second valve portion 33b of valve element 33 projects upward toward upper passage section 5A in the closed position shown in FIG. 3, and thereby produces the low pressure region effectively behind the second valve portion 33b to ensure the intake recirculating flow through connection passage 12.

In the open position, valve element 33 of gas control valve 31 extends continuously with partition 11 so as to minimize an increase of the flow resistance of intake air. Second valve portion 33b reduces the opening size of connecting passage 12 to reduce disturbance in the intake air flow. In this example, the plate-shaped valve element 33 is not a plate having a uniform thickness, but the first valve portion 33a of valve element 33 is taped so that the thickness becomes gradually smaller to the upstream end, and the second valve portion 33b is also taped so that the thickness becomes gradually smaller to the downstream end 33c, as shown in FIG. 1. This contouring of valve element 33 is effective for reducing the intake air flow resistance.

Figure 4:
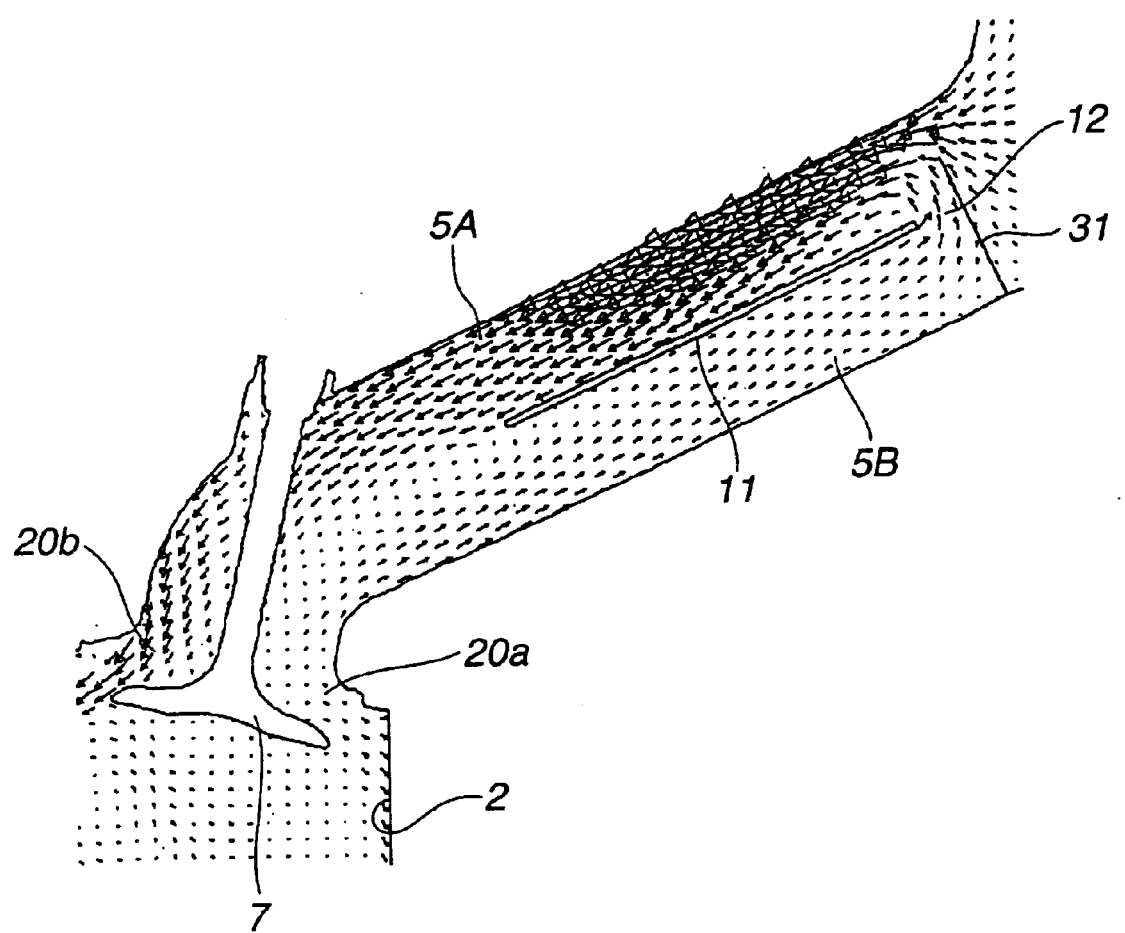
FIGS. 4 and 5 are schematic sectional views illustrating intake air streams in an intake port in the example of FIG. 1, and in an intake port in a comparative example.
Figure 5:
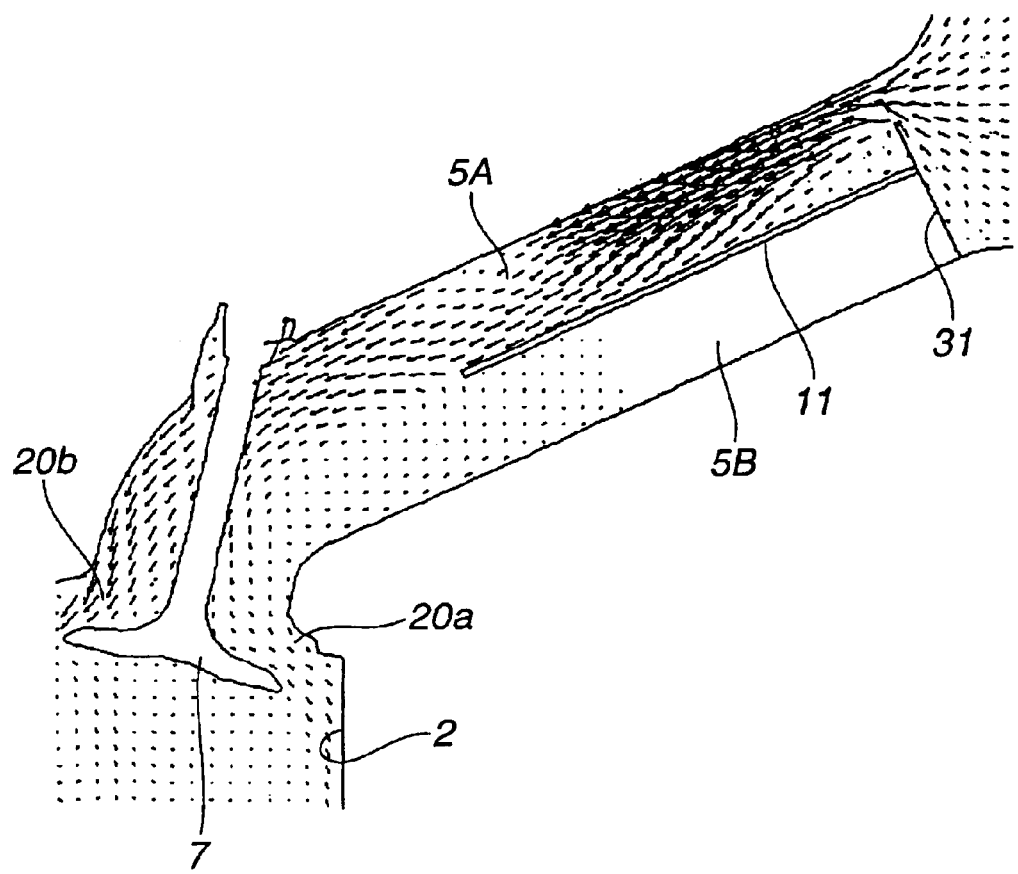

FIG. 4 shows the results of analysis of actual intake air flow in the intake system according to the first embodiment. In FIG. 4, the speed and direction of fluid flow in each of points are shown as a vector by a small arrow. The density of arrows indicates the flow rate. The flow rate is high in a region in which arrows are dense, and low in a region in which arrows are coarse. FIG. 5 shows intake air flow in a comparative example in which the connection passage 12 is closed. The arrangement of FIG. 5 corresponds to an intake system of earlier technology in which the intake air flow is deflected to one side merely by a partition wall 11 and a gas motion control valve 31. In both examples of FIGS. 4 and 5, the opening degree of gas motion control valve 31 is held at the same value (about 20%).

As evident from comparison between FIGS. 4 and 5, a considerable amount of intake air diffuses downward on the downstream side of the downstream end 11a of partition 11 in the example of FIG. 5, and flows through the lower open portion 20a on the lower side of intake valve 7 into the cylinder. In lower passage section 5B, the intake air is almost motionless and stagnant. In the case of FIG. 4, by contrast, intake air is recirculated from a lower region near intake valve 7. Therefore, the intake flow through lower open portion 20a is reduced significantly, and hence the flow through upper open portion 20b is increased correspondingly. Thus, the intake configuration of FIG. 4 can increase the incylinder tumble effectively.

Figure 6:
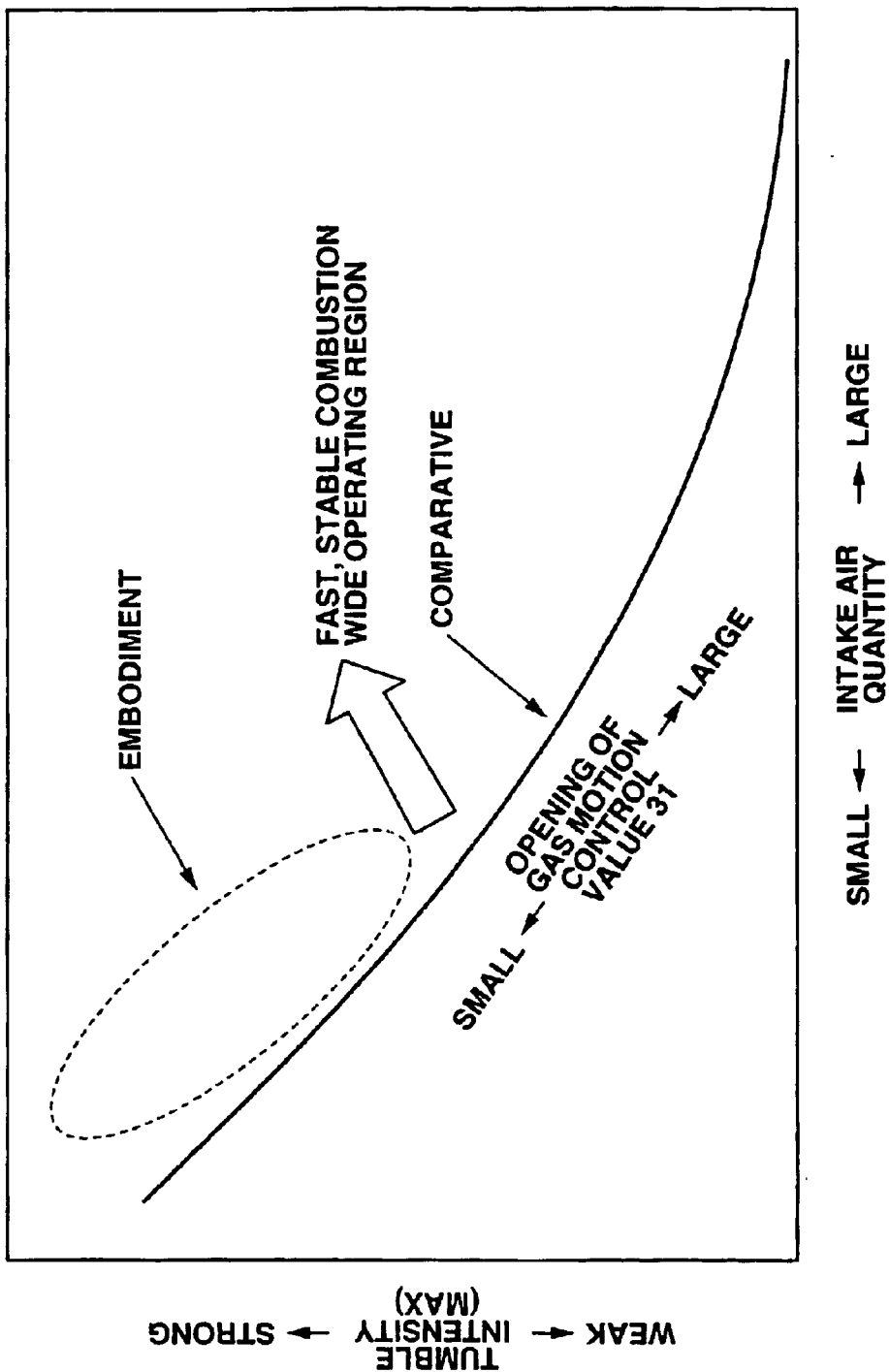
FIG. 6 is a graph showing the tumble intensity and the intake air quantity in the intake system of FIG. 1.

FIG. 6 shows a relationship between the tumble intensity and the intake air quantity in an intake system employing partition 11 and gas motion control valve 31 as in the examples of FIG. 4 and FIG. 5. In FIG. 6, the tumble intensity is expressed in terms of a maximum value of the tumble ratio during intake stroke. In general, the combustion tends to be slow and unstable when the tumble is weak, and the combustion tends to be fast and stable when the tumble is strong. A characteristic of the comparative example of FIG. 5 is shown by a solid line curve in FIG. 6. In the case of this solid line characteristic, the tumble and the intake air quantity are related to each other in the following manner. As the open area ratio or opening degree of gas motion control valve 31 is set to a smaller value, the tumble is increased but the intake air quantity becomes smaller. As the open area ratio or opening degree is increased, on the other hand, the intake air quantity is increased, but the tumble is decreased. A decrease of the intake air quantity means a reduction in the area of a tumble operating region in which tumble can be produced, that is an operating region in which gas motion control valve 31 can be closed. Inversely, an increase of intake air quantity means an increase in the area of the tumble operating region. In the example of FIG. 4 according to the first embodiment, there is formed a region shown by a broken line in FIG. 6 in which the intake air quantity can be increased with the tumble remaining constant, or the tumble is increased when the intake air quantity (or the opening degree) is held constant.

The intake system according to the first embodiment can employ an engine operating mode using the exhaust gas recirculation in a large quantity and strong tumbling in combination in a broader engine operating region, and thereby improve the fuel economy significantly as a whole. When compared in the same operating region, the intake system according to the first embodiment can further increase the amount of EGR with the aid of strong tumble, and further improve the fuel consumption.

In the first embodiment according to the present invention, fuel injector 41 is mounted in cylinder head 3 (not in intake manifold 21) on the downstream side of intake manifold 21, and fuel injector 41 is aimed to inject fuel through the space 5C formed on the downstream side of downstream end 11a of partition. Therefore, the fuel spray F produced by fuel injector 41 does not impinge on partition 11, irrespective of whether gas control valve 31 is closed or opened, so that fuel is injected into the cylinder without adhering to partition 11 and without growing to fuel droplets. Specifically, in the closed state of gas control valve 31 for increasing the tumble, fuel spray F merges with the intake air stream fortified in upper passage 5A by the recirculation through lower passage section 5B, and flows into cylinder 2 with atomization and mixing. Even in an idling operation after a cold start or other operating condition in which the intake air quantity is small, the wall flow of fuel on the inside wall surfaces of intake port 5 is reduced, and the amount of HC is reduced.

Figure 8:
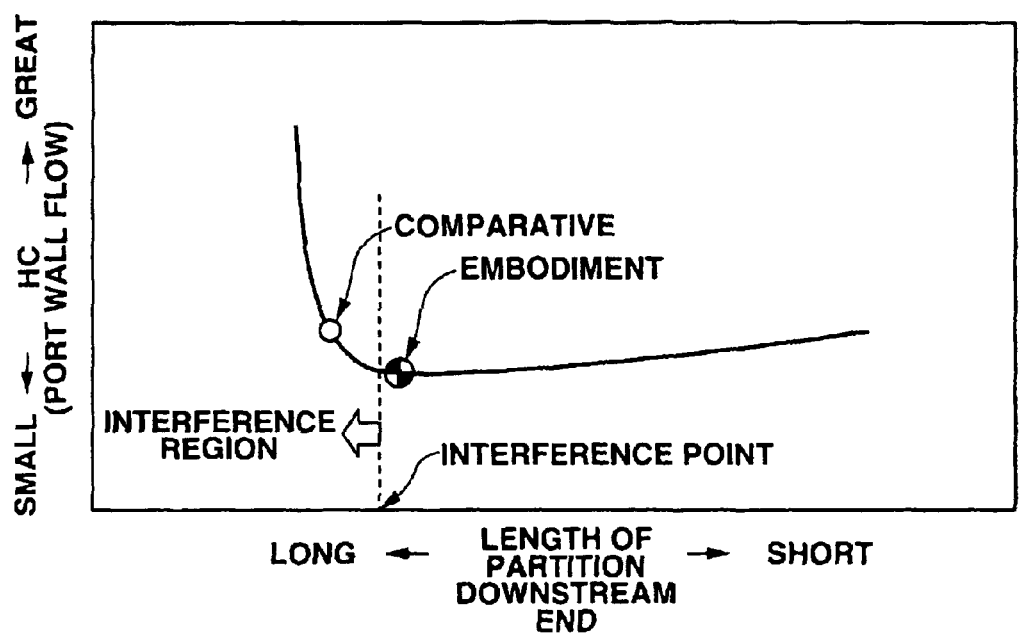
FIG. 8 is a graph showing a relation between the position of the downstream end of the partition and the HC emission quantity.

FIG. 8 shows a relationship between the position of downstream end 11a of partition 11, and the HC emission quantity in the cold operation. The HC emission tends to decrease by the effect of tumble as the partition 11 is extended. However, if the downstream end 11a of partition 11 is shifted downstream beyond an interference point, as shown in FIG. 8, at which downstream end 11a of partition 11 starts interfering with the fuel spray F, then the HC emission quantity increases sharply. In the case of a comparative example (corresponding to the system shown in the before-mentioned published Japanese Patent Application Kokai Publication No. H06(1994)-159203), fuel spray F impinges on the partition and hence the HC emission is increased as shown in FIG. 8. By contrast, the intake system of the first embodiment according to the present invention can minimize the HC emission by extending the partition 11 to the downstream side up to the limit of the noninterference range avoiding interference between fuel spray F and partition 11.

Figure 7:
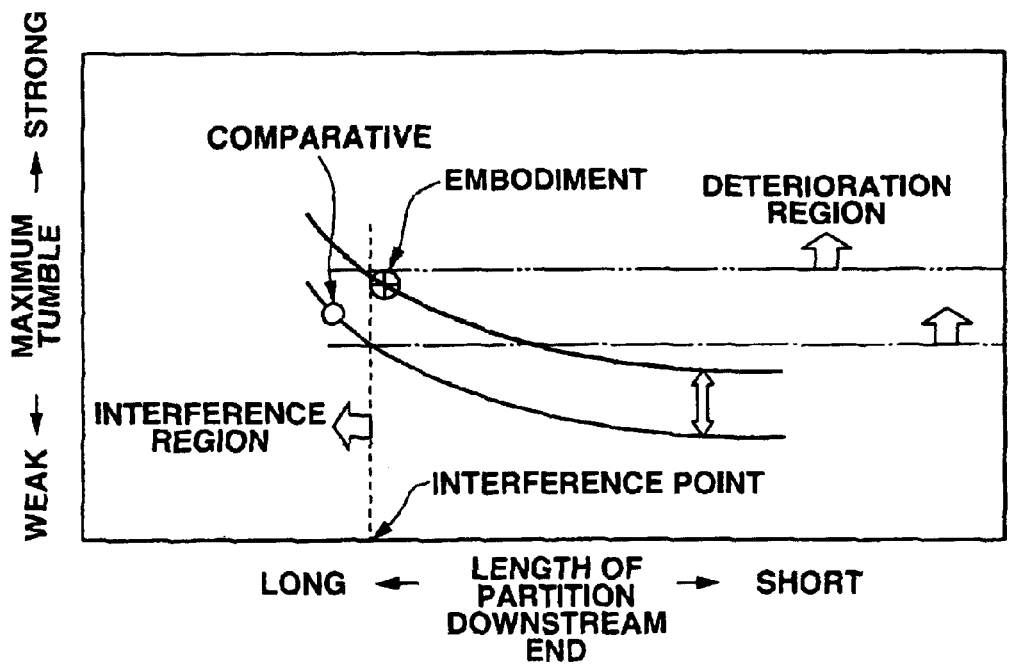
FIG. 7 is a graph showing a relation between the position of the downstream end of the partition and the tumble intensity.

FIG. 7 shows a relationship between the position of downstream end 11a of partition 11, and the tumble intensity. A heavy line shows the characteristic of the intake system of the embodiment, and a thin line shows the characteristic of the comparative example as shown in FIG. 5. In both characteristics, the tumble intensity is increased as the length of partition 11 is increased and the position of downstream end 11a of partition is shifted to the downstream side. For the same length of partition 11, the tumble intensity is greater in the embodiment by the effect of intake recirculation through lower passage section 5B, than the comparative example. When partition 11 is extended to the downstream side beyond the interference point, there arise problems such as deterioration of HC emission, irregularity of fuel wall flow, and deterioration of fuel responsiveness. The use of the point denoted as comparative example is undesirable. In other words, in order to obtain the tumble comparable to the embodiment, in the comparative example, it is necessary to increase the length of partition to the downstream side, despite the interference with fuel spray. In the embodiment as shown by the heavy line in FIG. 7, it is possible to increase the tumble intensity sufficiently without drawbacks due to interference between the fuel spray and partition.

Figure 9:
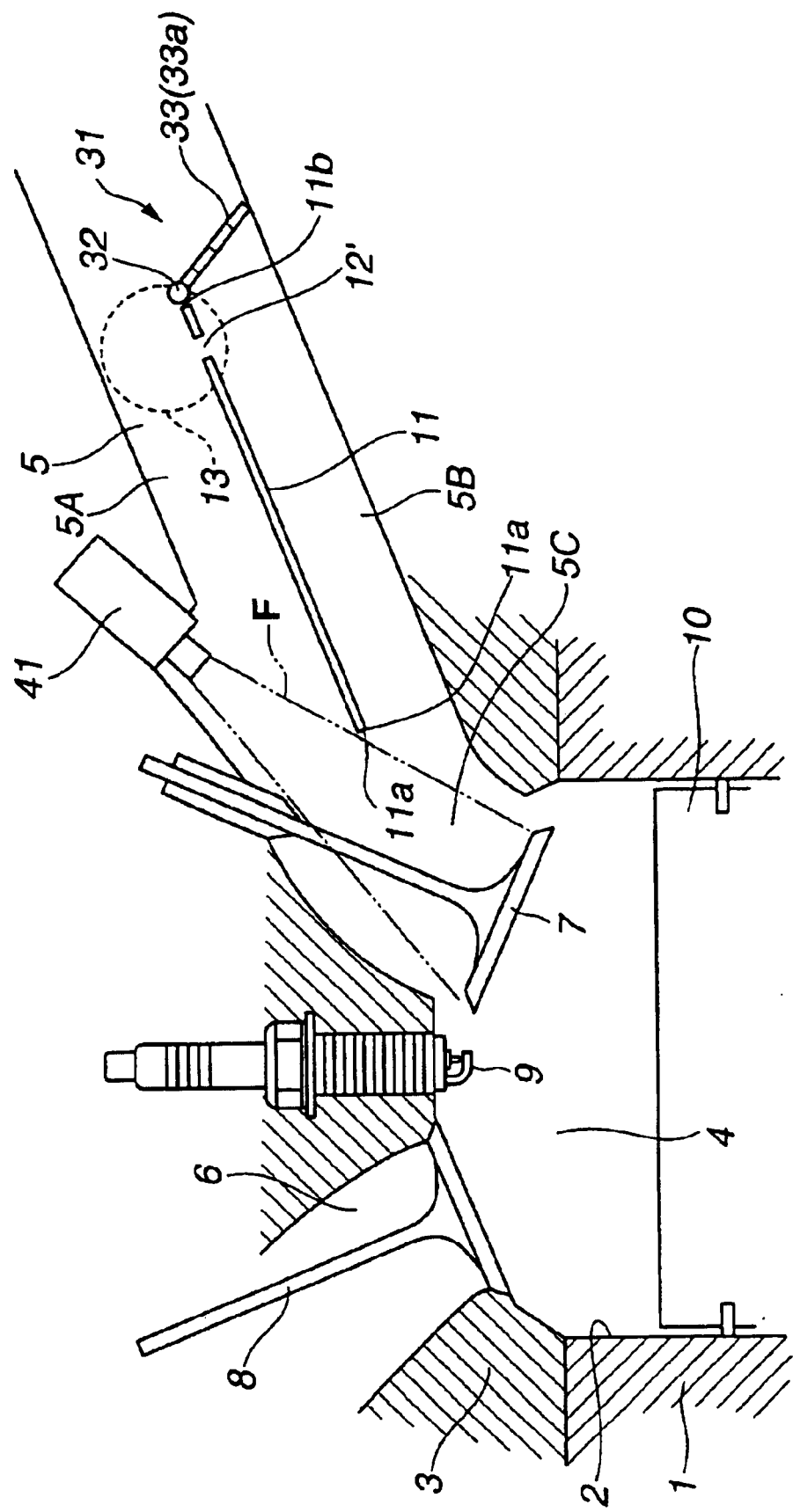
FIG. 9 is a sectional view showing an engine with an intake system according to a second embodiment of the present invention.
Figure 10:
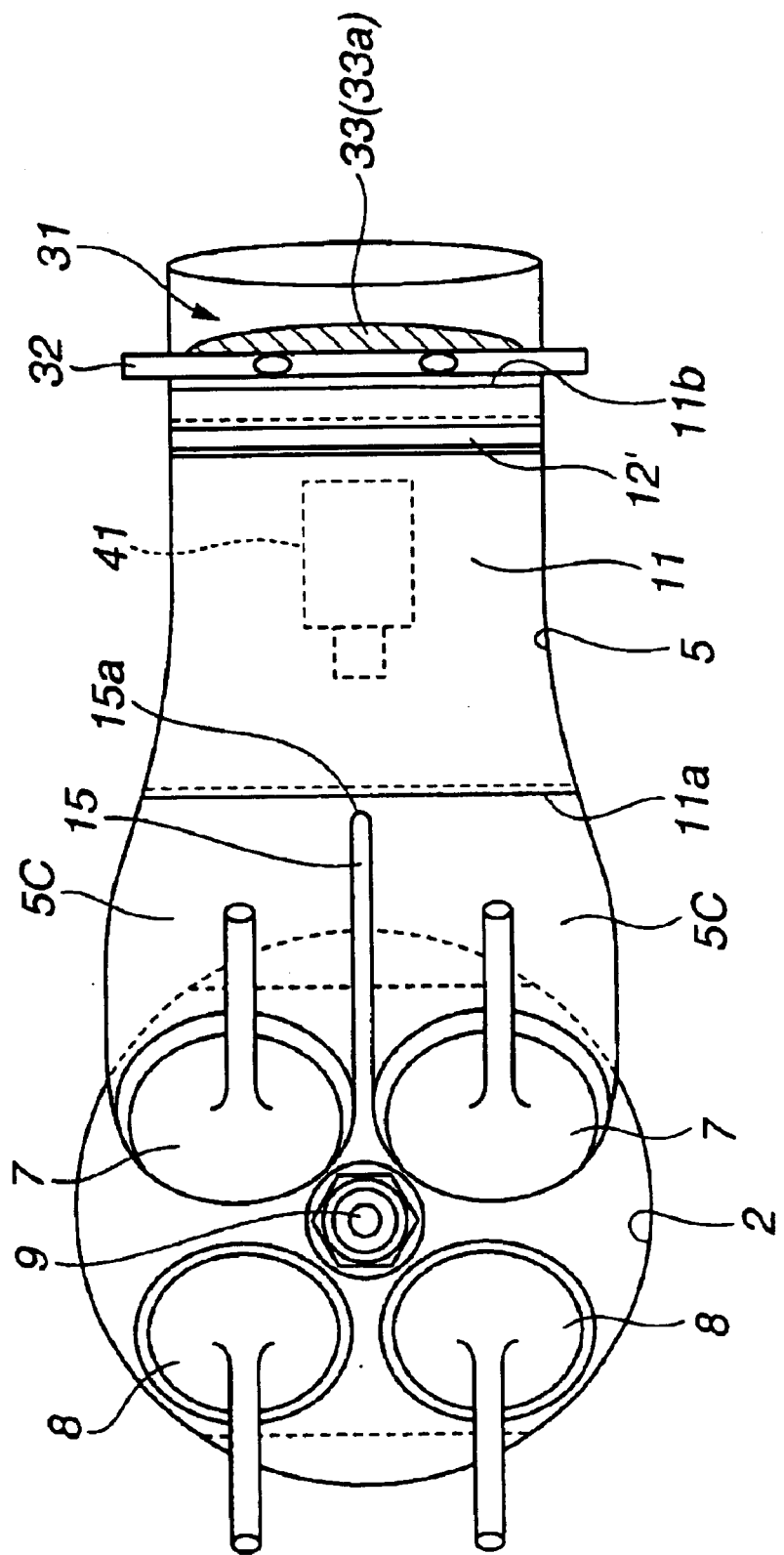
FIG. 10 is a plan view of the intake system of FIG. 9 as viewed from above.

FIGS. 9 and 10 schematically show an intake system according to a second embodiment of the present invention. This intake system is substantially identical to the intake system of FIG. 1 in most points as shown by using the same reference numerals. A valve element 33 of a gas control valve 31 has a first valve portion 33a, and has no second valve partition 33b. One end of valve element 33 is fixed to a valve shaft 32 which is located at a position adjacent to the upstream end 11b of partition with almost no clearance therebetween. The valve element 33 extends continuously from upstream end 11b of partition 11.

In the second embodiment, a connection passage 12' is opened in an upstream end portion of partition 11 near the upstream end 11b. As shown in FIG. 10, connection passage 12' is in the form of a slit extending in the direction of the cylinder row (in a direction perpendicular to the longitudinal direction of intake port 5, or in a widthwise direction of partition 11) in parallel to the upstream end 11b of partition 11. Connection passage 12' opens into a low pressure region 13 produced in the upper passage section 5A when the lower passage section 5B is closed by gas control valve 31, as shown in FIG. 9.

In the closed position in which valve element 33 closes the upstream end of lower passage section 5B, the connection passage 12' of partition 11 is open to the low pressure region 13 formed by gas motion control valve 31 in the closed position. Therefore, like the first embodiment shown in FIGS. 1 and 2, part of the intake air is recirculated through lower passage section 5B from downstream end 14 to connection passage 12'. In the closed position closing second passage section 5B, the plate valve element 33 of gas motion control valve 31 is slightly inclined so as to guide intake air into first passage section 5A toward upper inside wall surface 5a. In the open position, plate valve element 33 extends continuously from partition 11 to the upstream side.

A fuel injector (injection valve) 41 is disposed in cylinder head 3, above intake port 5 of cylinder head 3, at a relatively downstream position near the intake valves 7 so that the fuel spray F is directed to the valve openings of intake valves 7 without interference with partition 11, as in the preceding embodiment. This fuel spray F passes obliquely through an imaginary downstream extension of the partition 11, from the upper side of partition 11 to the lower side of the imaginary extension of the partition 11. In this example, partition 11 is extended to the downstream side and the downward end 11a of partition 11 is located downstream as long as possible, provided that the fuel spray F does not impinge on partition 11. Partition 11 is extended to the downstream side, up to a position very close to the outside boundary of fuel spray F.

The intake systems according to the first and second embodiments are designed to strengthen the tumble (vertical swirl). However, the intakes system according to the present invention can be used for strengthening swirl (horizontal swirl) in cylinder 2 by changing the position and orientation of partition 11. Alternatively, the intake system may be arranged to strengthen a swirling motion in an oblique plane by combining tumbling motion and swirling motion.

Figure 11:
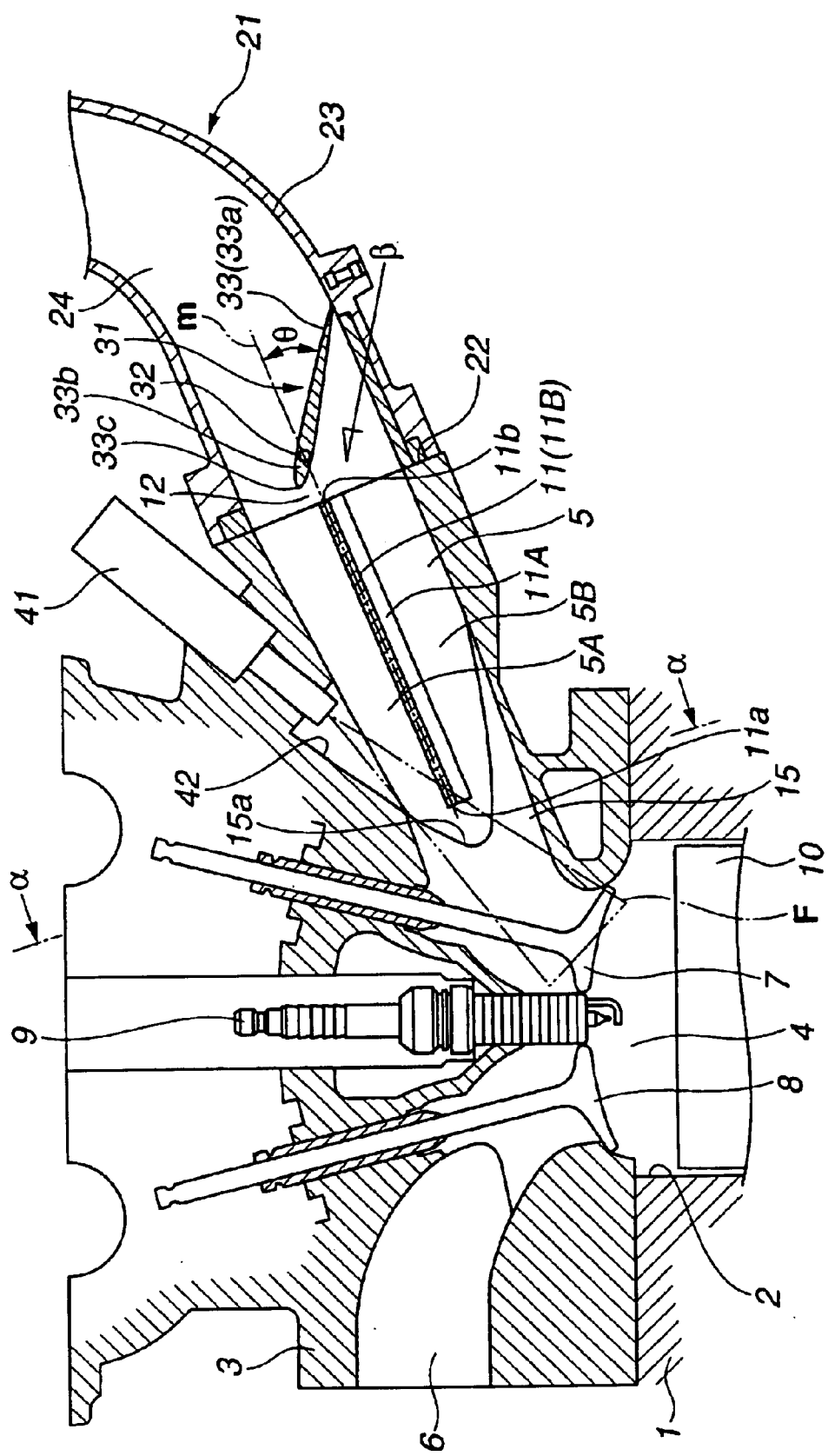
FIG. 11 is a sectional view showing an engine with an intake system according to a third embodiment of the present invention.
Figure 12:
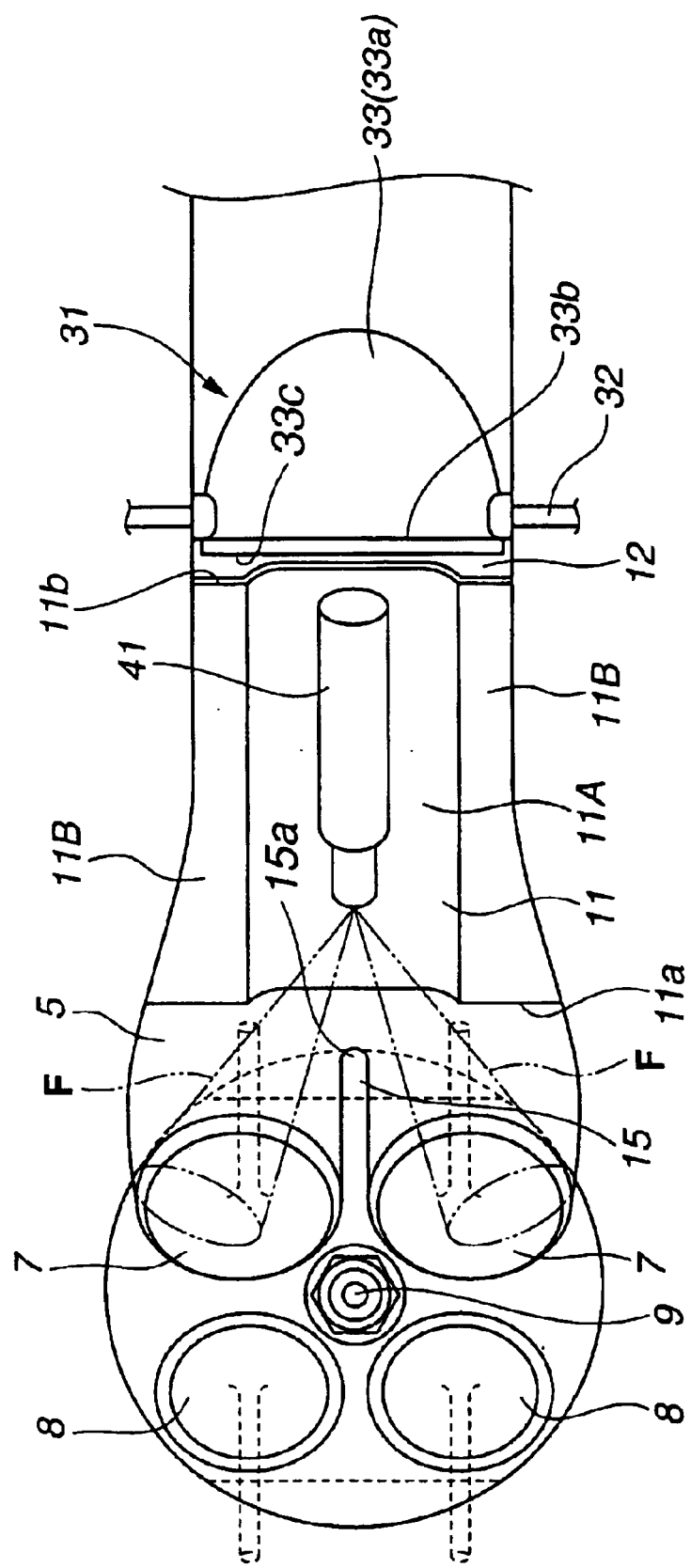
FIG. 12 is a plan view of the intake system of FIG. 11 as viewed from above.
Figure 13:
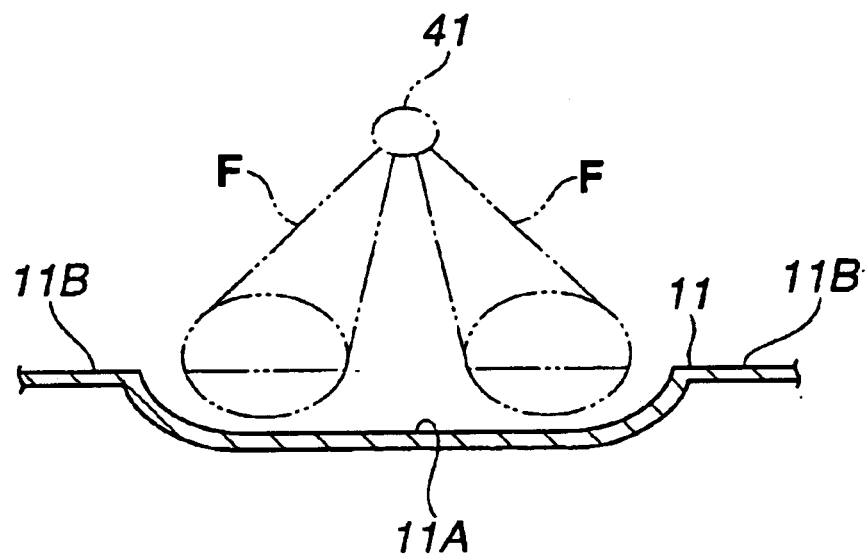
FIG. 13 is a sectional view taken across a line α—α in FIG. 11.

FIGS. 11~14 show an intake system according to a third embodiment of the present invention. This intake system is substantially identical to the intake system in the first embodiment, in most points as shown by using the same reference numerals. A partition 11 shown in FIGS. 11 and 12 is formed with a groove 11A extending in the longitudinal direction of partition 11 or in the longitudinal direction of intake port 5, between first and second side portions or side flanges 11B extending alongside the groove 11A. Groove 11A is located at the middle in the width of partition 1 (in the direction of the front and rear direction of the engine), and depressed downward toward the lower passage section 5B. In this example, groove 11A extends over the whole length of partition 11 from downstream end 11a to upstream end 11b. The cross sectional shape of groove 11A is uniform over the whole length from downstream end 11a of partition 11 to upstream end 11b. Groove 11A is relatively shallow, and has a relatively wide width and a shallow depth as compared to the width, as shown in FIG. 12 and FIG. 13. Each side of groove 11A is curved smoothly, as shown in FIG. 13. First and second side flanges 11B are formed in the same plane, and first and second side flanges 11B are flat and even with each other. A lateral end portion of each of first and second side flanges 11B is cast in the material of cylinder head 3.

In this example, a valve shaft 32 of gas motion control valve 31 is located on an (upstream) extension of the first and second side flanges 11B of partition on the upstream side of partition 11. A plate-shaped valve element 33 is fixedly mounted on valve shaft 32. Valve element 33 includes a first portion (or main portion) 33a extending from valve shaft 32 in one direction, and a second portion (short extension) 33b extending from valve shaft 32 in the opposite direction, as in the first embodiment. Second portion 33b is shorter than first portion 33a. First portion 33a is shaped like a half of an ellipse corresponding to the shape of a lower half of branch passage 24, as shown in FIG. 2. Second portion 33b has a downstream end 33c extending rectilinearly in parallel to a bearing surface 22 of cylinder head 3, and to the straight upstream end 11b of partition 11. Valve shaft 32 is close to upstream end 11b of partition 11, but spaced from upstream end 11 through such a distance as to avoid interference between second portion 33b of valve element 33, and upstream end 11b of partition 11. In this example, downstream end 33c of portion 33b is located at a position slightly recessed from a end flange surface of the branch section 23 to the upstream side. The flange surface of the branch section 23 is put in contact with the bearing surface 22 of cylinder head 3).

Valve shaft 32 is connected with an actuator (not shown). Gas motion control valve 31 is controlled to a closed position shown in FIG. 11 in an engine operating region to strengthen tumble. In the closed position to close the upstream end of second passage section 5B as shown in FIG. 11, first valve portion 33a is located on the upstream side of valve shaft 32, and valve element 33 is so inclined as to guide the intake flow toward upper inside wall surface into the first passage section 5A on the upper side. First valve portion 33a is so shaped as to fully close the region under valve shaft 32 in such an inclined position. In this example, an inclination angle θ of valve element 33 (that is, an angle formed between an upstream extension line m of partition 11 and valve element 33) in the closed state is in the range of 30°~40°. In the closed state, second valve portion 33b projects upward in upper passage section 5A above the level of partition 11, that is, above the level of side flanges 11B. Between upstream end 11b of partition and downstream end 33c of second valve portion 33b, there is formed an interspace 12 serving as a connection passage, as in the first embodiment, to allow recirculating flow of intake air in lower passage section 5B from lower passage section 5B to upper passage section 5A when lower passage section 5A is closed by gas motion control valve 31.

Figure 14:
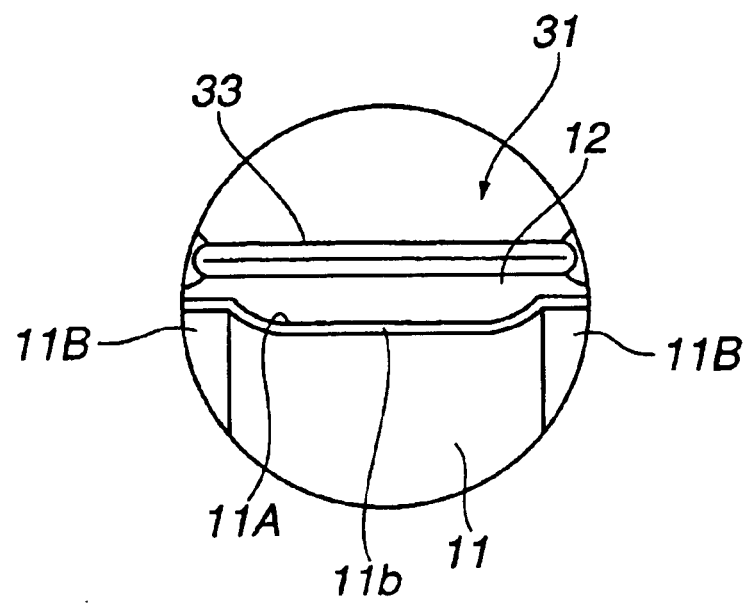
FIG. 14 is a view as viewed from a direction shown by an arrow β in FIG. 11.

The upstream end 11b of partition 11 is not straight, but the upstream end 11b is curved as shown in FIG. 14. Upstream end 11b of partition 11 is formed in a flat end surface which is parallel to the bearing surface 22 to which intake manifold 21 is joined, and which is perpendicular to the plane in which the side flanges 11B are formed. In the closed position of gas control valve 31, the interspace 12 serving as the connection passage is narrower in both of the side regions of flanges 11B and broader in the central region of groove 11A, as shown in FIG. 14 as viewed from a direction shown by an arrow β in FIG. 11 along valve element 33. That is, the connection passage 12 is made greater in opening size in the central region of intake passage 5, and made smaller near the inside walls of intake passage 5.

In an engine operating region such as a high speed high load region where the intake air quantity becomes greater, gas motion control valve 31 is brought to the open position at which valve element 33 extends in the longitudinal direction of intake port 5 (along the flow direction of the intake air). Both of first and second valve portions 33a and 33b of gas motion control valve 31, when in the open position, extend continuously from the first and second side flange 11B of partition 11, in line with partition 11 along the flow direction, so that the passage resistance becomes minimum. Downstream end 33c of second valve portion 33b confronts close to upstream end 11b of partition 11.

Fuel injector 41 is disposed above intake port 5 of cylinder head 3. In this example, fuel injector 41 is of a type producing a pair of fuel sprays F diverging in the shape of letter V so as to direct fuel toward a pair of intake valves 7, respectively. Fuel injector 41 is located at the middle in the lateral or widthwise direction as shown in the plan view of FIG. 12. As shown in FIG. 11, fuel injector 41 is inclined and positioned at a relatively downstream position near the intake valves 7 so that the fuel sprays F are directed to the valve openings of intake valves 7 without interference with partition 11. A fuel spout hole at the forward end of fuel injector 41 is located above partition 11. A recessed portion 42 is formed in the upper wall surface of intake port 5, so that the fuel sprays F pass through the space in this recessed portion 42 without interfering with the internal walls of cylinder head 3.

As shown in FIG. 13, the fuel sprays F pass through the region within groove 11A at the downstream end of partition 11. Groove 11A is so depressed as to avoid interference with fuel sprays F, and to allow further shift of the position of the downstream end 11a of partition to the downstream side. The depth and width of groove 11A are determined so as to maximize the effects of the shape of the connection passage 12 at the upstream end 11b and the special relationship between downstream end 11b and fuel sprays F. In the example of FIG. 13, the groove 11A is made wide enough to accommodate the left and right fuel sprays F, and the depth of groove 11A is determined so as to allow passage of lower parts of fuel sprays F through the space within groove 11A.

The internal combustion engine of this example is further equipped with an exhaust gas recirculation (EGR) system (not shown) of a known type including an EGR control valve. In particular, this engine is arranged to further decrease the fuel consumption in a part-load engine operating region by achieving stable combustion at a high EGR rate with the aid of incylinder tumble.

The intake system of FIG. 11 is operated in the same manner as explained with reference to FIGS. 3~6.

The center groove 11A formed in the center of partition 11 functions to enlarge the connection passage 12 in the central region on the upstream side of partition 11, and thereby improve the effect of intake recirculation through connection passage 12. The flow velocity of the intake air flow is higher in the central region than regions near the inside walls, and the low pressure region grows specifically in the central region on the downstream side of gas control valve 31. Therefore, the intake system with partition 11 with the center groove 11A can make effective use of the rapid central intake air flow and improve the effect of the intake air recirculation. In the closed state of gas control valve 31, groove 11A acts to guide and smooth the intake air flow in upper passage section 5A to the advantage of the intake recirculation.

With groove 11A, the opening size of connection passage 12 is increased in the closed state of gas control valve 31. Therefore, this intake system can improve the effect of the intake recirculation and allow the position of gas control valve 31 to be shifted toward the upstream end of partition 11 without decreasing the opening size of connection passage 12. Therefore, when the straight downstream portion of branch section 23 is short, it is possible to restrain an undesired increase in the flow resistance in the open position of gas control valve 31.

The formation of groove 11A at the downstream end of partition 11 allows the shift of the position of downstream end 11a of partition 11 further to the downstream side without causing interference with fuel sprays F, to the advantage of reinforcement of tumble.

If valve element 33 of gas control valve 31 is perpendicular to partition 11 as in the example shown in FIG. 4, the width of connection passage 12 is equal between the central region of groove 11A and side regions of side flanges 11B. In this case, too, the size of the flow passage between partition 11 and valve element 33 is increased by the formation of groove 11A. When the inclination angle θ of valve element 33 is smaller than 90°, the connection passage 12 is enlarged in the central region of partition 11.

Figure 15:
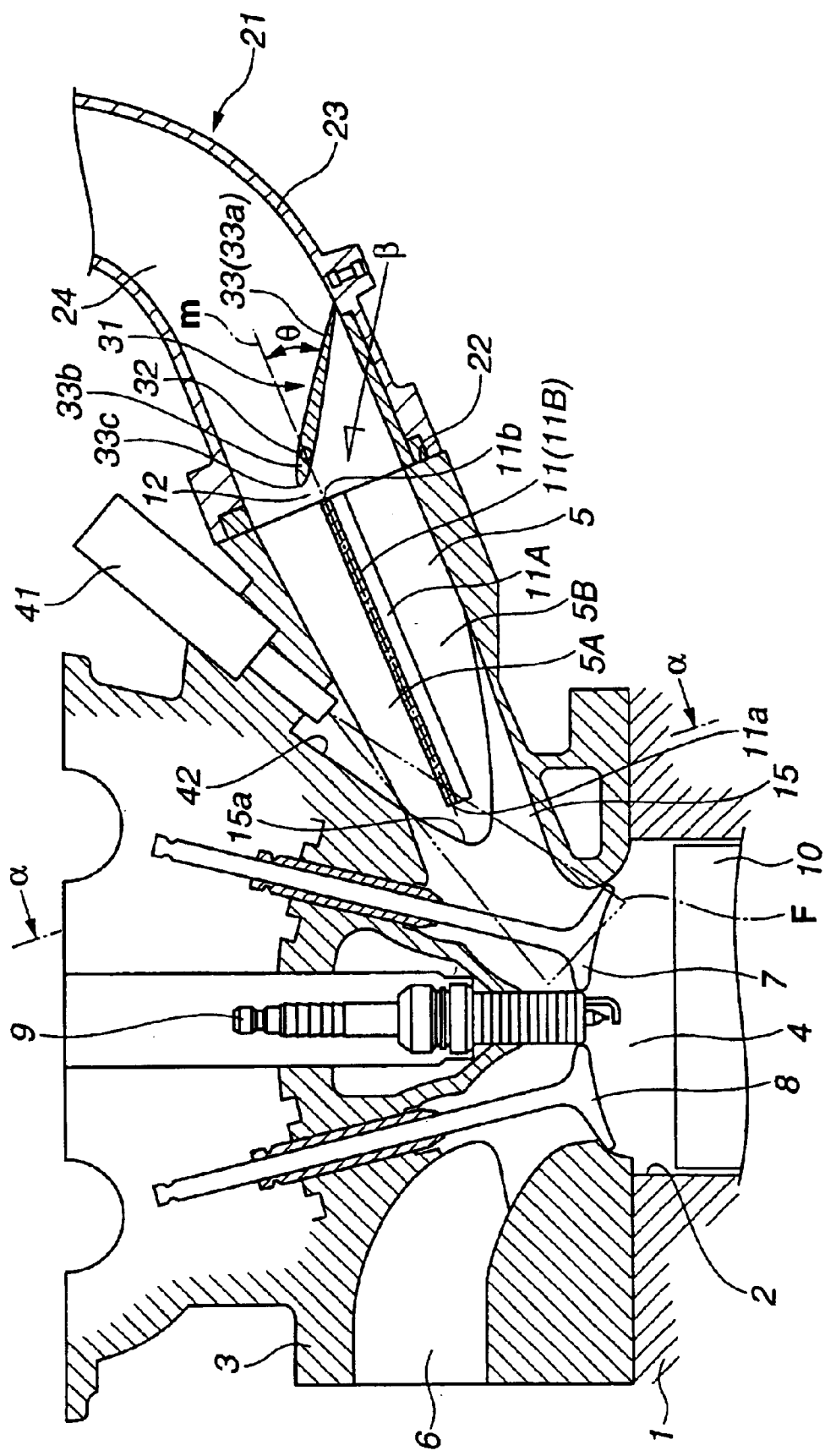
FIG. 15 is a sectional view showing an engine with an intake system according to a fourth embodiment of the present invention.
Figure 16:
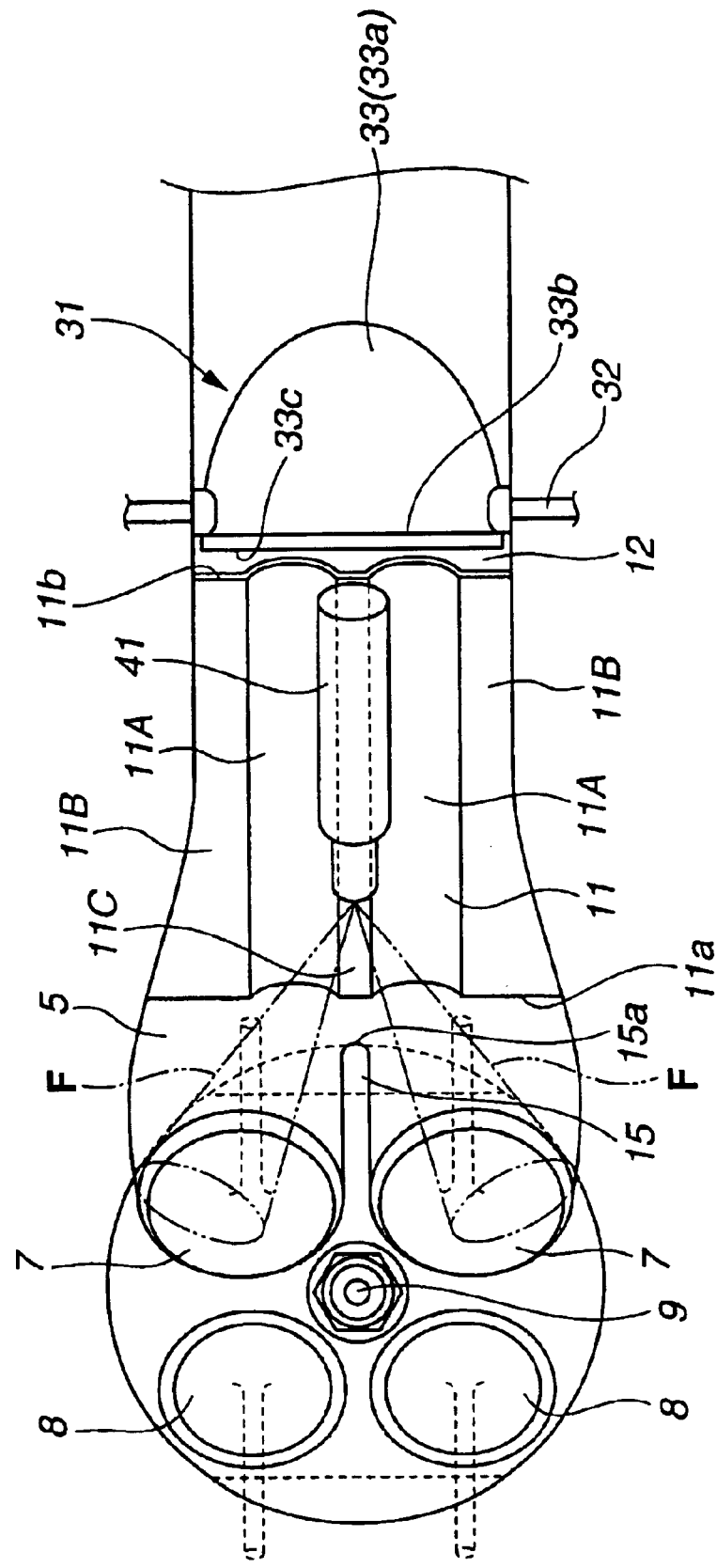
FIG. 16 is a plan view of the intake system of FIG. 15 as viewed from above.
Figure 17:
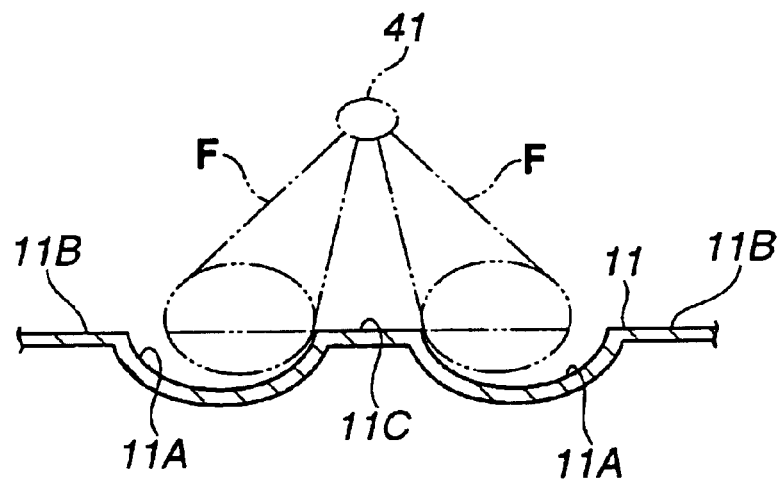
FIG. 17 is a sectional view taken across a line α—α in FIG. 15.

FIGS. 15~18 show an intake system according to a fourth embodiment of the present invention. This intake system is substantially identical to the intake system in the third embodiment, in most points as shown by using the same reference numerals. A partition 11 shown in FIGS. 15 and 16 is formed with a pair of parallel grooves 11A extending in the longitudinal direction of partition 11 or in the longitudinal direction of intake port 5, between first and second side portions or side flanges 11B. Between the grooves 11A, a land portion 11C extends in the same plane of side flanges 11B. Both grooves 11A are identical in cross sectional shape. Grooves 11A are located at the middle in the width of partition 1, and depressed downward toward the lower passage section 5B. In this example, grooves 11A extend over the whole length of partition 11 from downstream end 11a to upstream end 11b. The cross sectional shape of each groove 11A is uniform over the whole length from downstream end 11a of partition 11 to upstream end 11b. Each groove 11A is relatively shallow, and has a relatively wide width and a shallow depth as compared to the width, as shown in FIG. 17. As shown in FIG. 17, the cross section of each groove 11A is shaped like a half of an ellipse cut along the major axis. First and second side flanges 11B and land portion 11C are formed in the same plane, and they are flat and even with each other. A lateral end portion of each of first and second side flanges 11B is cast in the material of cylinder head 3.

As shown in FIG. 17, parts of the fuel sprays F pass through the inside regions of grooves 11A, respectively, at the downstream end of partition 11. Grooves 11A are so depressed as to avoid interference with fuel sprays F, and to allow lower parts of fuel sprays F to pass through the inside region of grooves 11A.

Figure 18:
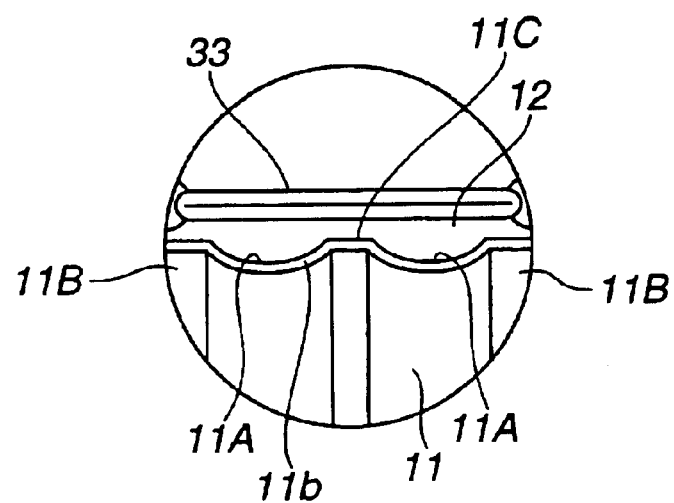
FIG. 18 is a view as viewed from a direction shown by an arrow β in FIG. 15.

With grooves 11A, the opening size of connection passage 12 is increased as shown in FIG. 18, and the length of partition 11 can be increased like the third embodiment. Therefore, this intake system of the fourth embodiment can provide the same advantages as the third embodiment. Specifically, the pair of grooves 11A function to guide a pair of intake air streams smoothly toward the position of the respective intake valves 7, and thereby reduce a flow impinging against the central wall 15 between intake valves 7 in intake port 5.

In the illustrated examples, at least one of partition 11 and gas motion control valve 31 corresponds to a flow regulating section. First means for defining an intake port corresponds to at least the cylinder head 3. Second means for dividing the intake port into first and second passage sections corresponds to partition 11. Third means for closing an upstream end of the second passage section and forming a low pressure region in the first passage section corresponds to valve element 33. Connection passage 12 or portions defining connection passage 12 corresponds to fourth means for drawing intake air from a downstream end of the second passage section through the second passage section to the low pressure region in the first passage section when the upstream end of the second passage section is closed. Fuel injector 41 corresponds to fifth means for injecting fuel in an oblique direction extending from the first passage section to the second passage section through a space (5C) between the partition and the downstream end of the intake port.

According to another aspect of the present invention, an internal combustion engine, comprises: a cylinder head defining an intake port leading to a cylinder of the engine; an intake valve located at a downstream end of the intake port; and a flow regulating section to regulate an intake air flow in the intake port, the flow regulating section including; a partition which extends in the intake port in a longitudinal direction of the intake port from an upstream end to a downstream end, which divides the intake port into first and second passage sections, and which is formed with a groove extending in the longitudinal direction of the intake port; a gas motion control valve located by the upstream end of the partition, to open and close the second passage section; and a connection passage to allow recirculating flow of intake air in the second passage section from the second passage section to the first passage section when the second passage section is closed by the gas motion control valve.

This application is based on a prior Japanese Patent Application No. 2003-100197 filed on Apr. 3, 2003, and a prior Japanese Patent Application No. 2003-100201 filed on Apr. 3, 2003. The entire contents of these Japanese Patent Applications No. 2003-100197 and No. 2003-100201 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An internal combustion engine, comprising:
   a cylinder head defining an intake port leading to a cylinder of the engine;
   an intake valve located at a downstream end of the intake port;
   a flow regulating section to regulate an intake air flow in the intake port, the flow regulating section including;
   a partition extending in the intake port in a longitudinal direction of the intake port from an upstream end to a downstream end which is located in the cylinder head, and dividing the intake port into first and second passage sections;
   a gas motion control valve located by the upstream end of the partition, to open and close the second passage section; and
   a connection passage to allow recirculating flow of intake air in the second passage section from the second passage section to the first passage section when the second passage section is closed by the gas motion control valve; and
   a fuel injector directed to inject fuel toward a valve opening of the intake valve through a space on the downstream side of the downstream end of the partition.

2. The internal combustion engine as claimed in claim 1, wherein the fuel injector is directed to cast a fuel spray across an imaginary extension of the partition toward the valve opening of the intake valve, without impinging on the partition, through the space on the downstream side of the downstream end of the partition.

3. The internal combustion engine as claimed in claim 1, wherein the downstream end of the partition is close to an outer boundary of the fuel spray produced by the fuel injector.

4. The internal combustion engine as claimed in claim 1, wherein the fuel injector is disposed above the partition.

5. The internal combustion engine as claimed in claim 1, wherein the fuel injector is received in a recess formed in the first passage section of the intake port.

6. The internal combustion engine as claimed in claim 1, wherein the cylinder of the engine is provided with two of the intake valves, and the fuel injector is arranged to inject fuel to both of the valve openings of the intake valves of the cylinder.

7. The internal combustion engine as claimed in claim 1, wherein the partition is formed with a groove extending in the longitudinal direction of the intake port.

8. The internal combustion engine as claimed in claim 7, wherein the groove extends to the upstream end of the partition, and the connection passage is formed between the gas motion control valve and an upstream end of the groove.

9. The internal combustion engine as claimed in claim 7, wherein the groove extends to the downstream end of the partition and a downstream end of the groove is so depressed as to avoid interference between a fuel spray produced by the fuel injector and the downstream end of the partition.

10. The internal combustion engine as claimed in claim 9, wherein the downstream end of the groove is depressed so that a fuel spray from the fuel injector passes through a region within the groove at the downstream end of the partition.

11. The internal combustion engine as claimed in claim 7, wherein the groove extends from the downstream end of the partition to the upstream end of the partition.

12. The internal combustion engine as claimed in claim 11, wherein a cross section of the groove is uniform from the downstream end of the partition to the upstream end of the partition.

13. The internal combustion engine as claimed in claim 7, wherein the partition includes first and second side portions extending in the longitudinal direction of the intake port, and the groove is formed between the first and second side portions.

14. The internal combustion engine as claimed in claim 7, wherein the groove is depressed toward the second passage section.

15. The internal combustion engine as claimed in claim 7, wherein the partition is formed with a plurality of the grooves.

16. The internal combustion engine as claimed in claim 15, wherein the cylinder of the engine is provided with two of the intake valves; the fuel injector is arranged to produce two fuel sprays directed, respectively, to the valve openings of the intake valves of the cylinder; and the partition is formed with two of the grooves each of which is so depressed as to avoid interference between a unique one of the fuel sprays produced by the fuel injector and the downstream end of the partition.

17. The internal combustion engine as claimed in claim 1, wherein the gas motion control valve comprises a valve shaft located on an imaginary upstream extension of the partition, and a valve element swingable on the valve shaft, between an open position at which the valve element extends continuously with the partition in the longitudinal direction of the intake port, and a closed position at which the valve element closes the second passage section, and inclines so as to guide an intake air stream from the upstream side, toward the first passage section.

18. The internal combustion engine as claimed in claim 1, wherein the valve element of the gas motion control valve comprises a first valve portion closing the second passage section, and a second valve portion projecting in the first passage section when the second passage section is closed by the first valve portion.

19. The internal combustion engine as claimed in claim 18, wherein the second valve portion of the gas motion control valve closes the connection passage at least partly so as to reduce an opening area of the connection passage when the gas motion control valve (31) is in an open position opening the second passage section.

20. The internal combustion engine as claimed in claim 1, wherein the second passage section is located below the first passage section in an up-down direction of the cylinder of the engine.

21. The internal combustion engine as claimed in claim 1, wherein the gas motion control valve is arranged to reduce an open sectional area of the intake port to produce a low pressure region in the first passage section of the intake port; and the connection passage connects an upstream end portion of the second passage section to the low pressure region produced in the first passage section to promote recirculating flow of intake air in the second passage section from a downstream end of the second passage section to the upstream end portion of the second passage section, and from the upstream end portion to the first passage section when the second passage section is closed by the gas motion control valve.

22. The internal combustion engine as claimed in claim 1, wherein the connection passage is in the form of a slit elongated in a direction perpendicular to the longitudinal direction of the intake port.

23. The internal combustion engine as claimed in claim 1, wherein the connection passage is in the form of an interspace between the upstream end of the partition and the gas motion control valve in a closed position closing the second passage section.

24. An intake apparatus for an internal combustion engine, comprising:
first means for defining an intake port;
second means for dividing the intake port into first and second passage sections extending in a longitudinal direction of the intake port;
third means for closing an upstream end of the second passage section and forming a low pressure region in the first passage section;
fourth means for drawing intake air from a downstream end of the second passage section through the second passage section to the low pressure region in the first passage section when the upstream end of the second passage section is closed; and
fifth means for injecting fuel in an oblique direction extending from the first passage section to the second passage section through a space between the partition and the downstream end of the intake port.

* * * * *